United States Patent [19]

Kristinsson et al.

[11] 3,920,669
[45] Nov. 18, 1975

[54] IMIDAZO[4,5-b]PYRIDINE DERIVATIVES

[75] Inventors: Haukur Kristinsson, Bottmingen; Adolf Hubele, Magden; Ernst Aufderhaar, Kaiseraugst, all of Switzerland

[73] Assignee: Ciba-Geigy Corporation, Ardsley, N.Y.

[22] Filed: Mar. 4, 1974

[21] Appl. No.: 447,805

[30] Foreign Application Priority Data

Mar. 7, 1973 Switzerland.......................... 3317/73
Jan. 28, 1974 Switzerland.......................... 1105/74

[52] U.S. Cl....................... 260/295 CA; 260/295 K; 260/295 AM; 260/999; 424/263
[51] Int. Cl.²........................................ C07D 401/04
[58] Field of Search..... 260/295 R, 295 AM, 295 K, 260/295 F, 295 CA

[56] References Cited
UNITED STATES PATENTS

| | | | |
|---|---|---|---|
| 3,590,045 | 6/1971 | Vogt ................................. | 260/295 R |
| 3,813,407 | 5/1974 | Doherty...................... | 260/295 AM |
| 3,813,408 | 5/1974 | Doherty et al. ............. | 260/295 AM |

Primary Examiner—Norman A. Drezin
Attorney, Agent, or Firm—Frederick H. Rabin; Harry Falber

[57] ABSTRACT

The invention relates to processes for the preparation of new imidazo (4,5-b) pyridines.

The new compounds correspond to formula

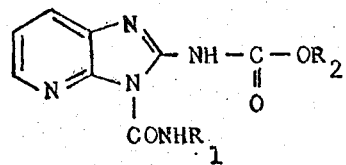

The symbols in this formula have the following meanings:

$R_1$ represents $C_1$–$C_{12}$–alkyl, haloalkyl, alkoxyalkyl, alkenyl, cycloalkyl, or a phenyl or benzyl radical each optionally mono- or polysubstituted by halogen, nitro, lower alkyl or trifluoromethyl, and $R_2$ represents $C_1$–$C_4$–alkyl.

The new compounds are prepared by reaction of a compound of formula

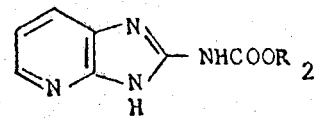

with an isocyanate of formula
$R_1NCO$ 2 Claims, No Drawings

IMIDAZO[4,5-b] PYRIDINE DERIVATIVES

The present invention relates to new imidazo [4,5-b]pyridines, to processes for their preparation, and to their use for the control of parasitic helminths.

The new compounds correspond to formula I

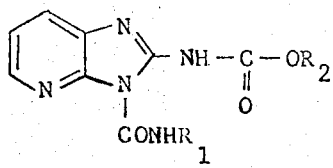

The symbols in this formula have the following meanings:

$R_1$ represents $C_1$–$C_{12}$–alkyl, haloalkyl, alkoxyalkyl, alkenyl, cycloalkyl, or a phenyl or benzyl radical each optionally mono- or polysubstituted by halogen, nitro, lower alkyl or trifluoromethyl, and $R_2$ represents $C_1$–$C_4$–alkyl.

By alkyl radicals are meant straight-chain or branched-chain radicals having 1 to 12 carbon atoms, such as, e.g. the methyl, ethyl, n-propyl, isopropyl, n-butyl, isobutyl, sec.butyl or tert.butyl radicals, as well as n-pentyl, n-hexyl, n-octyl, n-decyl, n-dodecyl and the isomers of these radicals. Lower alkyl radicals, preferably radicals having 1 to 4 carbon atoms, can be substituted by halogen, such as chlorine and bromine, or by alkoxy, with the number of carbon atoms in the haloalkyl radicals being 2 to 4, and in the alkoxyalkyl radicals in all 3 to 4. Suitable alkenyl radicals are propenyl and butenyl radicals, such as the 1-propenyl, 2-propenyl (allyl) or methallyl radical. Cycloalkyl radicals contain 3 to 10 carbon atoms in the ring; preferred radicals are those having 3 to 6 carbon atoms, e.g. the cyclopropyl, cyclobutyl, cyclopentyl and cyclohexyl radicals.

The compounds of formula I are prepared according to the invention by reaction of a compound of formula II

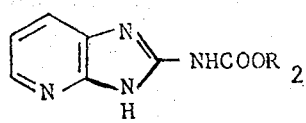

wherein $R_2$ has the meaning given under formula I, with an isocyanate of formula III $R_1NCO$ (III)

wherein $R_1$ has the meaning given under formula I.

The starting materials of formula II can be obtained using known methods (cp. U.S. Pat. Specification No. 3,590,045 and German Patent Specification No. 2,147,103) by reaction of a 2,3-diaminopyridine of formula IV

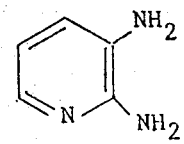

either a. with a compound of formula V obtained from S-alkylisothiourea and haloformic acid ester:

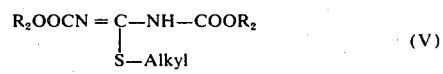

wherein $R_2$ has the meaning given under formula I, or b. with a compound of formula VI obtained from cyanamide and haloformic acid ester:

$NC-NHCOOR_2$ (VI)

wherein $R_2$ has the meaning given under formula I.

In formulae II to VI, the symbols $R_1$ and $R_2$ have the meanings given under formula I.

The reactions are preferably performed in the presence of solvents or diluents inert to the reactants, such as, e.g. aromatic hydrocarbons such as benzene, toluene, petroleum ether, xylenes, halogenated hydrocarbons such as halogenated benzenes, haloalkanes, ethers and ethereal compounds, esters, nitriles, etc..

The reaction temperatures are in the range of −10° to 150°C, preferably in the range of −10° to 100°C.

In the carrying out of the described process, it has proved advantageous to firstly place a compound of formula IV or V into the reaction vessel and to then add the pyridine derivative of formula III.

The following example illustrates the process according to the invention. In the subsequent table are listed compounds of formula I that are obtained in the same manner. Temperatures are expressed in degrees Centigrade.

EXAMPLE 1

1-n-Butylcarbamoyl-2-methoxycarbonylaminoimidazo[4,5-b]pyridine

A suspension of 19.2 parts of methyl-(imidazo[4,5-b]pyridin-2-yl)-carbamate and 500 parts of chloroform, to which have been added 9.9 parts of n-butylisocyanate, is stirred at room temperature for 48 hours. Small amounts of residue are filtered off, and the solution is completely concentrated by evaporation. The residue is suspended in a small amount of ether and filtered off.

The above given compound having a decomposition point of above 280° is obtained.

The starting material, methyl-(imidazo[4,5-b]pyridin-2-yl)-carbamate, can be prepared according to the U.S. Pat. Specification No. 3,590,045 and the German Patent Specification No. 2,147,103.

The following compounds of formula I are obtained in the manner described in Example 1:

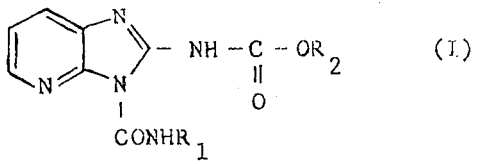

CONHR$_1$

| Comp. No. | R$_1$ | R$_2$ | Decomposition points |
|---|---|---|---|
| 1 | —C$_4$H$_9$(n) | —CH$_3$ | >280° |
| 2 | —C$_3$H$_7$(n) | —CH$_3$ | >250° |
| 3 | -C$_6$H$_3$Cl$_2$ (with Cl at two positions) | —CH$_3$ | >200° |
| 4 | -C$_6$H$_4$-NO$_2$ | —CH$_3$ | >200° |
| 5 | —CH$_3$ | —CH$_3$ | >200° |
| 6 | —CH$_2$CH$_2$Cl | —CH$_3$ | >250° |
| 7 | —CH$_2$—CH=CH$_2$ | —CH$_3$ | >150° |
| 8 | -C$_6$H$_4$-CH$_3$ | —CH$_3$ | >200° |
| 9 | —C$_3$H$_7$(i) | —CH$_3$ | 318–321°C |
| 10 | —C$_{12}$H$_{25}$(n) | —CH$_3$ | 220°C |
| 11 | —CH$_2$CH$_2$OCH$_3$ | —CH$_3$ | 320°C |
| 12 | -C$_6$H$_5$ | —CH$_3$ | 318–322°C |
| 13 | —CH$_2$-C$_6$H$_5$ | —CH$_3$ | 165°C |

The active substances of formula I are excellent anthelmintics. They are very compatible in the therapeutically effective doses, and have an outstanding action against:

Nematodes such as Ascaridia, Trichoslnonglyidse, Ancylostomatidae and Strongylidae, and Cestodes such as Anoplocephalidae and Taeniidae in the case of domestic animals and animals of commercial value, such as cattle, sheep, goats, horses, pigs, cats, dogs and poultry. The said active substances can be administered to the animals in single doses or in repeated doses, the single doses preferably being, depending on the species of the animal, between 25 and 1000 mg per kilogram of body weight. A better effect can be obtained in some cases by a protracted administration of the active substances, or smaller complete doses may suffice. The active substances or mixtures containing them can also be added to the feed or introduced into drinking troughs. The finished feed contains the substances of formula I preferably in a concentration of ca. 0.05 to 1.0 per cent by weight.

The active substances according to the invention can be administered to the animals, perorally or via the abomasum, in the form of solutions, emulsions, suspensions (drenches), powders, tablets, boluses and capsules. These preparations are made up, for example, by use of the usual solid carriers, such as kaolin, talcum, bentonite, sodium chloride, calcium phosphate, cotton-seed meal, or with liquids not reacting with the active substances, such as oils, and other solvents or diluents harmless to the animal organism. Provided that the physical and toxicological properties of solutions or emulsions are suitable for the purpose, the active substances may also be injected into the animals, for example, subcutaneously.

If water is to be used as the diluent for preparations such as, e.g. drenches or emulsions, or if the active substances are to be administered in the form of feed concentrates, then it is to be ensured, by means of a suitable protective formulation (e.g. coated granules), by embedding in hydrophobic materials (e.g. paraffin, silicone oils or silicone waxes) or by absorption onto inert solid carriers such as kaolin, talcum, bentonite, kieselguhr, or bolus alba, that premature decomposition does not occur.

If the anthelmintic agents are in the form of feed concentrates, then the carriers used are, for example, production feed, fodder grain or protein concentrates. Such feed concentrates or agents can contain, in addition to the active substances, also additives, vitamins, antibiotics, chemotherapeutical agents, or other pesticides, mainly bacteriostatics, fungistatics, antheimintics, coccidiostatics, or hormone preparations, substances having anabolic activity, or other substances promoting growth, affecting the quality of the meat of slaughter cattle, or being in some other way beneficial for the organism. In order to widen their sphere of action and to adapt them to suit the given conditions, the said anthelmintic active substances can be combined with other anthelmintics.

Examples of such anthelmintics are as follows:

Nematocides: Absonal, Alcopar, Anthelcide, Ascaridole, Badminth II, Bephenium, Bradosol, Cambendazol, Chlorphos, Chlorthion, Coumaphos, Cyanin, Destomycin, Diethyl-carbamazine, Dichlorophene, DDVP, 1,4-di-(D-glucosyl)-piperazine, Dithiazonine, Dow ET/70, Dowco 132, Dymanthine HCl, Egressin, Gainex, Hexachlorophene, Hexylresorcinol, Ionit, Levamisol, Mepacrine, Methylene violet, 1-Methyl-1-tridecylpiperazinium-4-carboxylic acid ethyl ester, Methyridine, Monopar, Narlene, Neguvon, Nepatodin, Nemural, Nidanthel, Parbendazol, Parvex, Phenothiazine, Piperazine, Polymethylene-piperazine, Promethazine, Pyrantel, Pyrathiazine, Pyrvinium-embonate, Rametin, Ronnel, Santonin, Shell 1808, Stilbazium, Tetramisole, Thenium, Thiabendazole, Thymolan, Vermella, Mebendazol;

Trematocides: Acedist, Bilevon M, Bilevon R, Bithionol, Disophenol, Freon 112, Hetol, Hetolin, Hexachloroethane, Hexachlorophene, Hilomid, Niclofolan, Nitrooxynil, Ranide, Tremerad, Tribromsalan (Tremasept II), Zanil, Brotianid;

Cestocides: Acranil, Arecoline, Atebrin, Bithionol, Bithionol oxide, Bunamidine, Cestodin, Cambendazol, Dibutyltin dilaurate, Dichlorophen, Dioctyltin dichloride, Dioctyltin laurate, Filixic acid, Hexachlorophene, Nidanthel, Terenol, Yomesan.

The anthelmintic action of imidazo[4,5-b]-pyridines is demonstrated by means of the following tests:

1. Tests on mice infested by oxyuris

The active substances are administered in the form of a suspension by means of a stomach probe to white mice infested with mouse threadworms (oxyuris). Five animals are used for each test. The active substances are administered to each group of animals once daily on 3 successive days. The daily dose per animal is 750 mg of active substance per kilogram of body weight.

The animals are then killed on the 4th day after commencement of the treatment and dissected. After dissection of the test animals, an evaluation is made on the basis of the number of mouse threadworms present in the intestines compared with the number present in the intestines of untreated control animals that have been identically infested.

2. Tests on mice infested by *Nippostrongylus brasiliensis*

The active substances are administered in the form of a suspension by means of a stomach probe to white mice infested with *Nippostrongylus brasiliensis*. Five animals are used for each test. The active substances are administered to each group of animals once daily on three successive days. The daily dose per animal is 750 mg of active substance per kilogram of body weight.

The animals are then killed on the 4th day after commencement of the treatment and dissected. After dissection of the test animals, an evaluation is made on the basis of a comparison of the number of *Nippostrongylus brasiliensis* present in the intestines of these animals with the number present in the intestines of untreated control animals simultaneously and identically infested.

3. Tests on mice infested by *Nematospiroides dubius*

The active substances in the form of a suspension are administered by stomach probe to white mice infested with *Nematospiroides dubius*. Five animals are used for each test. The active substances are administered to each animal once daily on 3 successive days. The animals are then killed on the 4th day after commencement of the treatment and dissected.

After dissection of the test animals, an evaluation is made by comparison of the number of nematodes present in the intestines of these animals with the number present in the intestines of untreated control animals simultaneously and identically infested.

4. Tests on mice infested by *Hymenolepsis nana*

The active substances in the form of a suspension are administered by stomach probe to white mice infested artificially with *Hymenolepsis nana*. Five animals are used for each test. The active substances are administered to each group of test animals once daily on 3 successive days. The animals are then killed on the 4th day after commencement of the treatment and dissected.

After dissection of the test animals, an evaluation is made by comparison of the number of tapeworms present in the intestines of these animals with the number present in the intestines of untreated control animals simultaneously and identically infested.

In these tests, the active substances corresponding to formula I have a good anthelmintic action, this action being of varying intensity with respect to the individual test organisms. Particularly effective compounds are compounds Nos. 1, 3, 4, 5, 6 and 7 (Table on pages 7 and 8), of which compound No. 1 is to be emphasised by virtue of its excellent action.

Anthelmintic agents according to the invention are prepared in a manner known per se by the intimate mixing and grinding of active substances of the general formula I with suitable carriers, optionally with the addition of dispersing agents or solvents inert to the active substances. The active substances can be obtained and used in the following forms:

solid preparations: dusts, granulates, coated granulates, impregnated granulates and homogeneous granulates;
water-dispersible concentrates of active substance: wettable powders;
liquid-preparations: solutions, pastes (emulsions).

The particle size of carrier substances for dusts and wettable powders is advantageously up to ca. 0.1 mm and for granulates 10 – 500 $\mu$ (0.01 – 0.5 mm).

Active-substance concentrations in the solid preparations are 0.5 to 80%, and in the liquid preparations 0.5 to 15%.

There can be added to these mixtures also additives stabilising the active substance, and/or nonionic, anion-active and cation-active substances, which, for example, ensure a better wettability (wetting agents) and dispersibility (dispersing agents).

Water-dispersible powder mixture
  25 parts of compound No. 1, Table pp. 7 and 8,
  3 parts of a mixture of polyoxyethylene/tall oil ester/urea,
  7 parts of polyvinylpyrrolidone,
  31.5 parts of highly dispersed silicic acid,
  33.5 parts of bolus alba.

The active substance is homogeneously mixed together with the polyoxyethylene/tall oil ester/urea mixture and polyvinylpyrrolidone and with the addition of ca. 30% of the given amount of silicic acid in a planetary mixer. The remaining portion of silicic acid and the bolus alba are subsequently added, and the whole is mixed in suitable mixers until homogeneity is obtained. The mixture is then ground in a dowelled disc mill until the particle size is below 20 microns.

Coated granulate
  25 parts of compound No. 3, Table pp 7 and 8,
  45 parts of microcrystalline cellulose,
  2.5 parts of highly dispersed silicic acid,
  7.5 parts of talcum,
  20 parts of polyvinyl acetate.

The active substance, talcum and ca. 90% of the given amount of silicic acid are successively worked into the solution of polyvinyl acetate in acetone/ethyl acetate mixture (1:1), and the whole mixed with the prepared portion of microcrystalline cellulose in a planetary mixer. The remainder of the silicic acid is subsequently added to the mixture, and this then kneaded until ready for granulation. The mixture is transferred to an oscillator-granulator and granulated to the desired particle size. The resulting granulate is dried and again granulated in a granulator down to a particle size of 30–300 $\mu$

We claim:

1. An imidazo (4,5-b) pyridine of the formula

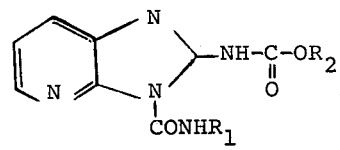

wherein
  $R_1$ represents alkyl of from 1 to 12 carbon atoms; haloalkyl of from 2 to 4 carbon atoms; alkoxyalkyl having a total of 3 or 4 carbon atoms; alkenyl of 3 or 4 carbon atoms; cycloalkyl of from 3 to 10 carbon atoms; phenyl; phenyl mono-substituted by lower alkyl, trifluoromethyl or nitro; phenyl mono- or di- substituted by halogen; or benzyl, and R$_2$ represents alkyl of from 1 to 4 carbon atoms.

2. 1-n-Butylcarbamoyl-2-methoxycarbonylamino-imidazo[4,5-b]pyridine.

* * * * *